United States Patent Office 3,319,716
Patented May 16, 1967

3,319,716
FLUID LOSS ADDITIVE FOR WELL FLUIDS, COMPOSITION AND PROCESS
Walter R. Dill, Duncan, Okla., assignor to Halliburton Company, Duncan, Okla., a corporation of Delaware
No Drawing. Filed Oct. 21, 1965, Ser. No. 500,338
23 Claims. (Cl. 166—42)

This application is a continuation-in-part of application Ser. No. 406,903, filed Oct. 27, 1964, and now abandoned, the disclosure of which is expressly incorporated herein by reference.

This invention relates to the treatment of oil and gas wells or the like and has particular reference to fluid loss additives, to well treating fluids containing the same, and to processes for use of such well treating fluids.

Various materials have heretofore been proposed and used for the reduction of fluid loss from fluids such as fracturing fluids and/or acidizing fluids used in the treatment of wells to stimulate production of oil or gas. Included among such materials have been gel-forming constituents such as soap thickeners, natural gums, finely divided minerals and various combinations thereof. While such materials do improve the fluid loss properties of the fluid to which they are added, they are subject to one or more disadvantages. Particularly troublesome has been the tendency of many such materials to cause damage to the producing formation, such as by plugging or reducing the permeability of the formation zone under treatment. If permanent damage is not done, at least expensive and time-consuming clean-up operations are often required to remove the fluid loss material from the permeable zones into which it has penetrated. A primary object of the present invention is, therefore, to provide a novel fluid loss additive composition which is not subject to the above-mentioned and other disadvantages of those heretofore proposed or used.

Another object of the present invention is to provide novel aqueous well treating fluid compositions containing a fluid loss additive incorporating as a major constituent thereof an oil soluble ingredient which, after the well treatment, is readily removed from the producing zone by contact with the oil produced.

Another object of the present invention is to provide a novel process for treating wells, utilizing well treating fluids of improved fluid loss characteristics.

Other objects and advantages of this invention it is believed will be readily apparent from the following detailed description of preferred embodiments thereof.

Briefly, this invention comprehends within its scope the discovery that a mixture of particles of an oil soluble resin and particles of a water soluble gum provides an excellent fluid loss additive for inclusion in aqueous well treaitng fluids or in the aqueous phase of well treating fluids of the emulsion type. The term "aqueous" as used herein is intended to include fresh water, brine, and other aqueous solutions such as acid solutions containing hydrochloric acid, hydrofluoric acid, acetic acid, formic acid and other acids commonly utilized as well as admixtures of such acids. The invention finds particular utility in acidizing and in fracturing fluids, but it is not inherently so limited, being useful in all aqueous fluids used in well treating operations where fluid loss control is desired, especially where the treatment is carried out in a producing zone or zones.

Many commercially available natural or synthetic oil soluble resins are useful in carrying out the present invention and others can be readily synthesized, as will be apparent to those skilled in the art. Aside from oil-solubility, an important requirement is that the resin be available in particulate form of sufficiently small size or sizes to be useful, or be sufficiently brittle to permit grinding to the desired particle size or sizes. Further, if thermoplastic or heat-deformable, the resin should have a softening point sufficiently high so as not to soften appreciably at the formation temperature while in use. Generally, a softening temperature of above about 150° F. is required. Suitable resins include the oil soluble modified acrylic resins, the oil soluble polystyrene resins, terpenes, phenolics substituted on the ortho or para position, modified alkyd resins, styrene-vinyl toluene copolymers, petroleum hydrocarbon derivatives prepared by the polymerization of olefins from distillates of cracked petroleum stocks and modified forms thereof, dimerized rosin acids, pentaerythritol esters of dimerized rosin acids, etc.

As used herein, the term "water soluble gums" includes the true natural gums such as karaya, guar, psyllium, tragacanth, talha, locust bean, damar, ghatti, etc., as well as cellulosic derivatives such as hydroxymethyl cellulose, carboxymethyl cellulose, carboxymethyl hydroxyethyl cellulose, and synthetic gums or polymers such as polyacrylamide, salts of polyacrylic acid, e.g., sodium polyacrylate, polyethylene glycol, methyl vinyl ether-maleic anhydride copolymer, urethane-polyethylene glycol copolymer, etc. For acidic treating solutions of a strength greater than that equivalent to about 1% aqueous solution of hydrochloric acid, especially suitable are materials known as limited swelling gums, examples thereof being karaya, locust bean and certain grades of guar gum.

In use of the fluid loss additive of the present invention, the ingredients may be added to the well treating fluids separately, but it is preferred to pre-mix the additive ingredients to form a dry blend suitable for use at a well site as needed. Preferably, the oil soluble resin and the water soluble gum are used in approximately equal proportions by weight. However, the ratio of resin to gum can be varied within wide limits, depending upon use requirements, including the composition of the well treating fluid and the characteristics of the formation being treated, but generally the weight ratio of resin to gum is between about 4:1 to about 1:4. Some oil soluble resins are not readily dispersible in the well treating fluid and in such case the resin or the additive composition is pre-mixed with a small amount of an alcohol such as isopropyl alcohol, and/or a nonionic or anionic surfactant or other wetting agent is added to the additive composition and/or to the well treating fluid, so that the oil soluble resin particles can be substantially uniformly dispersed in the well treating fluid, along with the water soluble gum.

The particle sizes and/or particle size distributions of the oil soluble resin and the water soluble gum can be varied within relatively wide limits depending upon the pore sizes in the formation being treated, larger particle sizes being used for larger pore sizes. Generally, the particle size of the oil soluble resin is between about 100 and about 325 mesh (U.S. Standard Sieve Series). The water soluble gum can range in particle size from about 20 mesh to about 325 mesh.

The fluid loss additive is employed in an amount between about 5 and about 500 pounds per 1000 gallons of well treating fluid, the preferred range being from 20 to 150 pounds per 1000 gallons.

The following specific examples illustrate the invention, but it is to be understood that the invention is not to be limited to the specific details thereof.

*Example I*

A fluid loss additive in accordance with the present invention was prepared by grinding an oil soluble alpha methyl styrene-vinyl toluene copolymer having a melting point of 207° F. to a fine powder and screening through a 200 mesh screen. The oil soluble resin particles were thoroughly blended with 325 mesh karaya gum, the ratio by weight of resin to gum being 1:1. Laboratory core tests were conducted to compare the performance of this additive with the use of the resin alone, with the use of silica flour alone and with the use of commercially available silica flour-karaya gum fluid loss additive. The additives were tested in a well acidizing fluid comprising an aqueous solution containing 15% by weight of hydrochloric acid and in order to wet the oil soluble resin for uniform dispersion in the acid, 0.1% by weight of a sulfonated hydrocarbon surfactant was added to the acid prior to introduction of the fluid loss additives.

The tests were carried out by flowing fluids through cores having a surface area of 15.88 cm.$^2$ and a thickness of 2.54 cm. Nitrogen gas at a pressure of 1000 p.s.i. was used to force the fluid through the cores, the tests being conducted at 80° F. In each test a core was carried through a series of steps and in each step the time for 10 ml. increments of fluid to pass through the core was noted. In each step the fluid was passed through the core in the same direction. In Step 1 of each test the permeability of the core was established by flowing kerosene therethrough. In Step 2, the acid containing the fluid loss additive was passed through the core and in Step 3, kerosene was passed through the core to simulate oil production after treatment and to determine the effect of contact of the additive by oil. The data obtained on this series of tests were as follows:

TEST I.—(BERA SAND FORMATION)

| Additive Type | Oil Soluble Resin | Silica Flour |
|---|---|---|
| Step 1 | Kerosene:<br>2nd 10 ml., 5 sec.<br>3rd 10 ml., 5 sec.<br>4th 10 ml., 6 sec. | Kerosene:<br>2nd 10 ml., 5 sec.<br>3rd 10 ml., 5 sec.<br>4th 10 ml., 5 sec. |
| Step 2 | 15% HCl+25# oil soluble resin per 1,000 gal. acid:<br>2nd 10 ml., 10 sec.<br>3rd 10 ml., 15 sec.<br>4th 10 ml., 20 sec. | 15% HCl, 25# silica flour per 1,000 gal. acid:<br>2nd 10 ml., 5 sec.<br>3rd 10 ml., 5 sec.<br>4th 10 ml., 5 sec. |
| Step 3 | Kerosene: Flow too fast to measure. | Kerosene: Flow too fast to measure. |
| Step 4 | 15% HCl+25# (oil soluble resin-karaya gum 1:1) per 1,000 gal. acid:<br>2nd 10 ml., 84 sec.<br>3rd 10 ml., 210 sec.<br>4th 10 ml., 390 sec. | 15% HCl+25# (silica flour-karaya gum 1:1) per 1,000 gal. acid:<br>2nd 10 ml., 14 sec.<br>3rd 10 ml., 62 sec.<br>4th 10 ml., 367 sec. |
| Step 5 | Kerosene: Flow too fast to measure. | Kerosene:<br>2nd 10 ml., 75 sec.<br>3rd 10 ml., 50 sec.<br>4th 10 ml., 37 sec. |

TEST II.—(BERA SAND FORMATION)

| Additive Type | Oil Soluble Resin | Silica Flour |
|---|---|---|
| Step 1 | Kerosene:<br>2nd 10 ml., 5 sec.<br>3rd 10 ml., 5 sec.<br>4th 10 ml., 6 sec. | Kerosene:<br>2nd 10 ml., 1 sec.<br>3rd 10 ml., 1 sec.<br>4th 10 ml., 1 sec. |
| Step 2 | 15% HCl+25# (oil soluble resin-Karaya gum 1:1) per 1,000 gal. acid:<br>Flow almost stopped after 8 ml.<br>2nd 10 ml., 105 sec.<br>3rd 10 ml., 275 sec.<br>4th 10 ml., 650 sec. | 15% HCl+25# (Silica flour-karaya gum 1:1) per 1,000 gal. acid:<br>Flow almost stopped after 12 ml.<br>2nd 10 ml., 50 sec.<br>3rd 10 ml., 850 sec. |
| Step 3 | Kerosene: Flow too fast to measure. | Kerosene:<br>2nd 10 ml., 49 sec.<br>3rd 10 ml., 31 sec.<br>4th 10 ml., 26 sec.<br>5th 10 ml., 26 sec. |

TEST III.—(O-SAND FORMATION)

| Additive Type | Oil Soluble Resin | Silica Flour |
|---|---|---|
| Step 1 | Kerosene:<br>2nd 10 ml., 5 sec.<br>3rd 10 ml., 5 sec.<br>4th 10 ml., 5 sec. | Kerosene:<br>2nd 10 ml., 5 sec.<br>3rd 10 ml., 5 sec.<br>4th 10 ml., 5 sec. |
| Step 2 | 15% HCl+25# (oil soluble resin-karaya gum 1:1) per 1,000 gal. acid:<br>2nd 10 ml., 95 sec.<br>3rd 10 ml., 255 sec.<br>4th 10 ml., 375 sec. | 15% HCl+25# (Silica flour-karaya gum 1:1) per 1,000 gal. acid:<br>2nd 10 ml., 15 sec.<br>3rd 10 ml., 135 sec.<br>3 ml., 420 min. |
| Step 3 | Kerosene:<br>2nd 10 ml., 18 sec.<br>3rd 10 ml., 15 sec.<br>4th 10 ml., 9 sec.<br>5th 10 ml., 6 sec. | Kerosene:<br>2nd 10 ml., 75 sec.<br>3rd 10 ml., 55 sec.<br>4th 10 ml., 35 sec.<br>5th 10 ml., 25 sec. |

Based upon the above test results and on the known fluid loss properties of karaya gum, it was concluded that the oil soluble resin-karaya gum additive of the present invention substantially reduces loss of fluid to the formation below that obtainable with an equal amount of either the oil soluble resin or the gum alone. It is also clear from the data that the oil soluble resin-karaya gum additive decreased fluid loss more quickly than did the silica flour-gum additive, while at the same time being far more efficient in permitting oil production through the core to be regained.

*Example II*

A fluid loss additive in accordance with the invention was prepared as in Example I, except that the oil soluble resin used in this example was a commercially available saturated alkyl aromatic hydrocarbon resin prepared by the polymerization of olefins from distillates of cracked petroleum stocks modified to have an acid number of about 10, having a melting point of 258° F. (Picco 145–PI, Pennsylvaina Industrial Chemical Corporation). The acid composition was the same as in Example I and the tests were conducted in the same manner, the results indicating that this additive was somewhat less efficient in controlling fluid loss than that of Example I, but more efficient from the standpoint of regaining permeability after use. Core damage with this additive was much less severe than in cores treated with the silica flour-gum fluid loss additive.

*Example III*

A series of fluid loss tests were conducted with core plugs of Bedford Limestone to compare the fluid loss characteristics of several 15% hydrochloric acid acidizing fluids, each containing 50 pounds per 1000 gallons of a different fluid loss agent. The core plugs, each one inch long and one and three-fourths inch in diameter were saturated under vacuum with 5% salt water. The permeability of the cores to 5% salt water was measured, following which the acidizing fluid containing the fluid loss additive, previously agitated for 30 minutes to allow time for hydration of the gum present, was flowed through the core at 80° F. using nitrogen pressure at 1000 p.s.i. for displacement. After this acidizing treatment, those cores in which the acidizing fluid did not channel through were reversed in the core holder and the permeability was re-measured with 5% salt water to obtain an indication of formation damage.

The fluid loss additives comprised, respectively, a blend of equal parts of 20–40, 40–80 and 80 mesh karaya gum; a blend of 20–40 and 40–80 mesh karaya gum; 80 mesh karaya gum; 325 mesh karaya gum; a blend of equal parts by weight of 80 mesh karaya gum and the resin of Example I (20–325 mesh); a blend of equal parts by weight of 325 mesh karaya gum and the resin of Example I (20–325 mesh); a blend of equal parts by weight of 80 mesh karaya gum and the resin of Example II (325 mesh); and a blend of equal parts by weight of 325 mesh karaya gum and the resin of Example II (325 mesh).

The results of the fluid loss tests indicated that the 325 mesh karaya gum-resin mixtures were the most efficient and consistent fluid loss control additives of those tested in this series. The 325 mesh karaya gum alone was effective to shut off the flow of acid through the core, but the results were not as consistent as the results obtained with the gum-resin mixtures. Further, the reverse flow tests indicated that a permeability loss of approximately 36% resulted with the use of the acidizing fluids containing 325 mesh karaya gum alone, whereas those fluids containing the karaya gum-resin mixture showed a slight increase in permeability.

*Example IV*

A fluid loss additive was prepared by thoroughly blending equal parts by weight of karaya gum screened through a 150 mesh screen and an oil soluble resin comprising a modified dicyclopentadiene type of synthetic alkyl aromatic petroleum hydrocarbon (Inkovar 190, Pennsylvania Industrial Chemical Corporation), the resin having been ground to the following screen analysis:

U.S. Standard screen size: Percent
+80 ------------------------------ 29.3
−80+100 --------------------------- 6.6
−100+120 -------------------------- 8.4
−120+140 -------------------------- 9.6
−140+170 -------------------------- 6.1
−170+200 -------------------------- 6.7
−200+230 -------------------------- 8.1
−230+270 -------------------------- 8.5
−270+325 -------------------------- 10.2
−325 ------------------------------ 6.6

The above fluid loss additive was dispersed in 15% hydrochloric acid at a concentration of 50 pounds per 1000 gallons, the acid containing 0.1% by weight of a sulfonated hydrocarbon surfactant. The resulting acidizing fluid was treated in Luder's limestone core plugs. In carrying these tests out, the permeability of the cores to kerosene was first measured and then the acidizing fluid was passed through the core, followed by back-flow of kerosene. The tests were carried out at various temperatures using hydrogen pressure of 1000 p.s.i., with the following results:

| Kerosene Permeability | Acidizing Fluid | Kerosene Back Flow | °F. | P.s.i. |
|---|---|---|---|---|
| 40 ml., 5′37″ | 6 ml., 30′ | 40 ml., 28′42″ | 80 | 1,000 |
| 40 ml., 6′15″ | 5.5 ml., 30′ | 40 ml., 31′ | 80 | 1,000 |
| 40 ml., 7′15″ | 6 ml., 30′ | 40 ml., 10′30″ | 140 | 1,000 |
| 40 ml., 7′43″ | 5 ml., 30′ | 40 ml., 11′24″ | 140 | 1,000 |
| 40 ml., 5′57″ | 7 ml., 30′ | 40 ml., 7′43″ | 200 | 1,000 |
| 40 ml., 6′24″ | 5.5 ml., 30′ | 40 ml., 5′48″ | 200 | 1,000 |
| 40 ml., 6′07″ | Acid broke through. | | 200 | 1,000 |

The average 6 ml. fluid loss obtained with the fluid loss control additive of the present invention represents a high degree of efficiency, due in part at least to the even distribution of the resin particle sizes. The relatively slow recovery of maximum flow capacity upon back-flow with kerosene is also to be noted. This advantageous result is also apparently due in part to the use of an oil soluble resin having a somewhat uniform particle size distribution as indicated, apparently permitting the finer resin particles to penetrate into the pores of the core to a greater depth than the larger particles, resulting in the resin particles being dissolved and removed more slowly.

*Example V*

Fluid loss tests were conducted with Bedford limestone core plugs 1½ inches ling and 1¾ inches in diameter. The wall of the core plug was painted with epoxy resin. The cores were pre-heated in kerosene and the initial flow was measured with kerosene using a differential pressure (nitrogen gas) of 1000 p.s.i. The flow was then measured with 15% HCl containing 0.1% sulfonated hydrocarbon surfactant and fluid loss additive. The resin was ground and screened as shown in the data. After the acid flow was measured, the core was reversed in the holder and the kerosene back flow was measured.

The following data was obtained using a 1:1 blend of karaya gum and resin. Dymerex, Pentalyn K, and a 1:1 blend of Dymerex and Pentalyn K was used with the gum. Dymerex contains 80% rosin acid dimers and 20% monomeric rosin acids and neutral material. Pentalyn K is the pentaerythritol ester of Dymerex. It is prepared by esterification using 10–20% excess alcohol, the amount of excess depending on the acid number of the Dymerex. A typical Pentalyn K has an acid number of 14, and it is prepared by esterification at 275–285° C. to provide a reasonable esterification cycle. Both of these materials are available commercially from the Hercules Powder Company. The resins were screened (U.S. Standard Screen Sizes) as designated.

The 20–40–40 resin is resin screened as follows: 20% thru 60 on 100, 40% thru 100 on 200, 40% thru 200. The 20–20–20–20–20 resin was screened as follows: 20% thru 60 on 100, 20% thru 100 on 140, 20% thru 140 on 200, 20% thru 200 on 325, 20% thru 325. The karaya gum-resin blend was used at a concentration of 100 pounds per 1000 gallons of 15% HCl. The tests were conducted at 200° F. using a differential pressure of 1000 p.s.i.

| Resin | Screen Size of Resin | Initial Kero. Flow | Acid Flow | Kero. Back Flow |
|---|---|---|---|---|
| Dymerex | 20-40-40 | 10 ml., 44 sec | Bk thru, 16 min | |
| Do | 20-40-40 | 10 ml., 55 sec | 13 ml., 36 min | 10 ml., 84 sec |
| Do | 20-40-40 | 10 ml., 84 sec | 7.5 ml., 36 min | 10 ml., 170 sec |
| Do | 20-20-20-20-20 | 10 ml., 36 sec | Bk thru, 31 min | |
| Do | 20-20-20-20-20 | 10 ml., 36 sec | Bk thru, 7 min | |
| Do | 20-20-20-20-20 | 10 ml., 44 sec | Bk thru, 10 min | |
| Pentalyn K | 20-40-40 | 10 ml., 48 sec | Bk thru, 15 min | |
| Do | 20-40-40 | 10 ml., 51 sec | Bk thru, 6 min | |
| Do | 20-40-40 | 10 ml., 78 sec | Bk thru, 8 min | |
| Do | 20-40-40 | 10 ml., 73 sec | Bk thru, 27 min | |
| Do | 20-20-20-20-20 | 10 ml., 36 sec | Bk thru, 6 min | |
| Do | 20-20-20-20-20 | 10 ml., 38 sec | Bk thru, 6 min | |
| Dymerex and Pentalyn K | 20-20-20-20-20 | 10 ml., 43 sec | 14 ml., 26 min | 10 ml., 55 sec |
| Do | 20-40-40 | 10 ml., 34 sec | 12 ml., 36 min | 10 ml., 49 sec |
| Do | 20-40-40 | 10 ml., 33 sec | Bk thru, 7 min | |
| Do | 20-40-40 | 10 ml., 42 sec | Bk thru, 3 min | |

The following data was obtained at 250° F. using 150 pounds of the previously described blends per 1000 gallons of 15% HCl.

| Resin | Screen Size of Resin | Initial Kero. Flow | Acid Flow | Kero. Back Flow |
|---|---|---|---|---|
| Dymerex | 20-20-20-20-20 | 10 ml., 28 sec | Bk thru, 1 min. 15 sec |  |
| Do | 20-20-20-20-20 | 10 ml., 29 sec | Bk thru, 3 min. 50 sec |  |
| Do | 20-20-20-20-20 | 10 ml., 36 sec | Bk thru, 3 min |  |
| Pentalyn K | 20-20-20-20-20 | 10 ml., 29 sec | Bk thru, 7 min |  |
| Do | 20-20-20-20-20 | 10 ml., 34 sec | Bk thru, 3 min |  |
| Do | 20-20-20-20-20 | 10 ml., 44 sec | Bk thru, 10 min |  |
| Dymerex and Pentalyn K | 20-40-40 | 10 ml., 37 sec | Bk thru, 6 min |  |
| Do | 20-40-40 | 10 ml., 35 sec | Bk thru, 6 min. 26 sec |  |
| Do | 20-40-40 | 10 ml., 30 sec | Bk thru, 9 min. 50 sec |  |

These fluid loss control data illustrate the fluid loss control efficiency of Dymerex, Pentalyn K, and a 1:1 blend of Dymerex and Pentalyn K. The average break through time for Dymerex, Pentalyn K, and the blend of Dymerex and Pentalyn K, at 200° F. was 23, 15 and 14 minutes respectively. At 250° F. the average breakthrough time was 3, 7 and 7.5 minutes respectively. The data indicates that Dymerex provides the most effective fluid loss control at 200° F. while the blend of Dymerex and Pentalyn K provided the most effective fluid loss control at 250° F.

As has been indicated, particle sizes and particle size distributions of the oil soluble resin and the water soluble gum can vary, depending primarily upon the permeability characteristics of the formation being operated upon. Generally, it is preferred to utilize materials of reasonably wide particle size distribution. The following tabulation exemplifies suitable particle sizes for the oil soluble resin and karaya gum where used in formations having a permeability less than about 7 millidarcies, the screen sizes being U.S. Standard:

*Oil Soluble Resin*

Screen size: Percent
- −100+120 ------------------------------- 10
- −120+140 ------------------------------- 60
- −140+170 ------------------------------- 10
- −170+200 ------------------------------- 10
- −200+230 ------------------------------- 10

*Karaya gum*

Screen size: Percent
- −140+170 ------------------------------- 10
- −170+200 ------------------------------- 10
- −200+230 ------------------------------- 10
- −230+270 ------------------------------- 15
- −270+325 ------------------------------- 15
- −325 ------------------------------------ 40

It will be readily understood to those skilled in the art that acidizing fluids and/or fracturing fluids containing the fluid loss additives of the present invention are utilized in acidizing operations, in hydraulic fracturing operations and in combinations thereof in the same manner as such operations are normally carried out, the fluids being pumped into the well and out into the formation at the desired location utilizing well-known methods and equipment. Thus, in carrying out acidizing operations, the acidizing fluid containing the fluid loss additive of the present invention, along with one or more of the usual corrosion inhibitors, penetrants, non-emulsifiers, sequestering agents and the like, is introduced into the well and then into the well formation in any convenient manner as by pumping the acidizing fluid. After injection of the acidizing fluid into the formation, the well may be closed in to allow time for the acid to attack the formation, the shut-in time generally not exceeding three or four hours. The spent acid may be withdrawn as by pumping, bailing or allowing the well to flow, if it will.

Conventional procedures are similarly followed in carrying out hydraulic fracturing operations wherein the fluid loss additives of the present invention are incorporated in the fracturing fluid which generally contains sand or other spacer or propping agents, together with other additives as desired. In carrying out a combined acidizing and fracturing operation, the treating fluid is pumped or otherwise introduced into the well and applied under pressure against the well strata at a desired location. In some instances well packers or the like are first set or expanded in the well at one or both locations above and below the zone or formation to be treated. These assist in confining the treating fluid and facilitate the building up of pressure in the well. As the pumping of the treating fluid is continued, sufficient pressure is built up at the desired location in the well to produce fractures in the adjacent well formation or to open or extend the fractures and the like already existing therein. During this time, the acid in the treating fluid is available to attack substances contained in the formation or other structures in the well. For example, the hydrochloric acid may by chemical action remove or reduce in size limestone or bentonite particles which are plugging or blocking pore spaces or channels in the well formation.

The exact behavior of the hole treating fluid in the well cannot be known with certainty and it is understood that the invention is not limited to any particular theory of its behavior. However, with regard to the function of the fluid loss additive, it is believed that the superior results obtained are due to the inclusion in the treating fluid of the relatively small quantities of the two differently-behaving agents which in combination permit the desired low fluid loss properties to be obtained. Thus, the water soluble gum behaves somewhat as a gelling or plastering agent, but is generally not included in sufficiently large quantities to cause actual gelling of the fluid. On the other hand, the finely divided oil soluble resin particles behave somewhat as temporary plugging or bridging agents which are dispersed throughout the treating fluid and are moved or forced therewith into contact with the porous well strata. These plugging or bridging agents, being of relatively small size and weight, such as in comparison with the sand or other spacer or propping agents which may also be present, do not readily settle out of the fluid, but are carried by the fluid into fissures and crevices and then into plugging or bridging relation to adjacent pores and other small openings in the well strata. The result is that the low fluid loss additive provides a combined plugging or bridging and plastering effect which reduces the fluid loss into the strata and thereby tends to confine the treating solution in the desired zone. The fluid loss additive is generally present in an amount which is not sufficient to appreciably increase the apparent viscosity of the aqueous treating fluid, the relatively low viscosity thereof permitting higher pumping rates to be obtained, thus facilitating the obtaining of a higher rate of fluid injection and increased fluid penetration into the zone of the formation.

In combination with the foregoing, it is believed that the low fluid loss additive functions somewhat as a control agent which improves the efficiency of the acid in treating the well. That is, by reducing the general fluid loss into the formation, the additive tends to prevent the acid from becoming prematurely spent, with the result that a greater amount of unspent acid remains available to attack substances in the zones where the treatment is considered most needed.

After the well formation has been fractured and otherwise treated, as aforesaid, it may be desirable for the pumping of the treating fluid to be discontinued and the well closed-in for a period of time while the acid continues to attack substances in the formation or other structures in the well. In some instances it may be necessary or desirable to subsequently perform one or more additional acidizing treatments. In any event, the treating fluid is ordinarily removed from the well after the treatment is completed, at which time the oil solubility characteristics of the resin portion of the fluid loss additive permit its removal by flow of oil from the formation.

Having fully described my invention, it is to be understood that I do not wish to be limited to the details set forth, but my invention is of the full scope of the appended claims.

I claim:

1. A fluid loss additive for well treating fluids comprising a mixture of finely divided particles of an oil soluble resin selected from the mixture consisting of dicyclopentadiene type synthetic alkyl aromatic petroleum hydrocarbons, oil soluble resins containing rosin acid dimers and pentaerythritol esters of rosin acid dimers and finely divided particles of a water soluble gum.

2. The fluid loss additive of claim 1 wherein the weight ratio of said resin to said gum is between about 4:1 and 1:4.

3. The fluid loss additive of claim 1, wherein said water soluble gum is a limited swelling gum.

4. The fluid loss additive of claim 1, wherein said water soluble gum is karaya gum.

5. The fluid loss additive of claim 1, wherein the particle size of said resin is in the range 100–325 mesh.

6. The fluid loss additive of claim 1, wherein said particles of resin are of varying sizes, distributed over a particle size range of from about 100 to about 325 mesh.

7. The fluid loss additive of claim 1, wherein said oil soluble resin is a dicyclopentadiene type synthetic alkyl aromatic petroleum hydrocarbon.

8. The fluid loss additive of claim 1, wherein said oil soluble resin contains rosin acid dimers.

9. The fluid loss additive of claim 1, wherein said oil soluble resin comprises a pentaerythritol ester of rosin acid dimers.

10. The well treating fluid of claim 1 wherein the amount of said components is in the range 20–150 pounds per 1000 gallons of fluid, and wherein the weight ratio of said resin to said gum is in the range of from about 4:1 to about 1:4.

11. A process for acidizing an earthen formation adjacent an oil producing zone in a well, comprising the steps of applying to said formation as aqueous acidizing fluid containing a substantially uniform dispersion of finely divided particles of an oil soluble resin and a water soluble gum, and thereafter producing oil from said zone through the treated formation, whereby at least a portion of said oil soluble resin is dissolved in said oil and thereby removed with the oil so produced.

12. The process of claim 11, wherein said acidizing fluid is hydrochloric acid and said gum is a limited swelling gum.

13. The process of claim 11 wherein said oil soluble resin is a synthetic alkyl aryl hydrocarbon polymer prepared by the polymerization of olefins from distillates of cracked petrolum stocks.

14. The process of claim 11 wherein said oil soluble resin is a synthetic alkyl aryl hydrocarbon polymer prepared by the polymerization of olefins from distillates of cracked petroleum stocks and having an acid number of about 10.

15. The process of claim 11 wherein said oil soluble resin is a styrene-vinyl toluene copolymer.

16. The process of claim 11 wherein said oil soluble resin is a dicyclopentadiene type synthetic alkyl aromatic petroleum hydrocarbon.

17. The process of claim 11 wherein said oil soluble resin contains rosin acid dimers.

18. The process of claim 11 wherein said oil soluble resin comprises a pentaerythritol ester of rosin acid dimers.

19. A process for hydraulically fracturing an underground well formation comprising the steps of contacting said formation with a composition comprising an aqueous fluid having dispersed therein finely divided particles of an oil soluble resin and a water soluble gum, the total combined amounts of said resin and said gum being sufficient to substantially reduce loss of fluid from said composition to said formation, subjecting the composition to pressure sufficient to fracture the formation and thereafter releasing said pressure.

20. The process of claim 19 wherein said fluid is a dilute acid and wherein said gum is a limited swelling gum.

21. An acidizing fluid for well treatments comprising an aqueous solution of an acid containing a sufficient amount of fluid loss additive comprising a mixture of finely divided particles of an oil soluble resin selected from the mixture consisting of dicyclopentadiene-type synthetic alkyl aromatic petroleum hydrocarbons, oil soluble resins containing rosin acid dimers and pentaerythritol esters of rosin acid dimers and finely divided particles of water-soluble gum to substantially reduce the fluid loss of said fluid.

22. The fluid of claim 21 wherein said gum is karaya gum.

23. The fluid of claim 22 wherein said acid is hydrochloric acid.

References Cited by the Examiner
UNITED STATES PATENTS

| | | | |
|---|---|---|---|
| 3,110,668 | 11/1963 | Anderson | 252—8.5 |
| 3,237,693 | 3/1966 | Huitt | 166—42 |
| 3,252,904 | 5/1966 | Carpenter | 252—8.55 |

CHARLES E. O'CONNELL, *Primary Examiner.*

N. C. BYERS, *Assistant Examiner.*